(No Model.)

G. R. SCOTT.
PIPE JOINT.

No. 352,754. Patented Dec. 22, 1885.

Witness:
Charles Hemje
Thos D. Smith

Inventor:
George R. Scott.

UNITED STATES PATENT OFFICE.

GEORGE R. SCOTT, OF WASHINGTON, DISTRICT OF COLUMBIA.

PIPE-JOINT.

SPECIFICATION forming part of Letters Patent No. 332,754, dated December 22, 1885.

Application filed November 3, 1885. Serial No. 181,752. (No model.)

*To all whom it may concern:*

Be it known that I, GEORGE R. SCOTT, a citizen of the United States, residing at Washington, in the District of Columbia, have invented certain new and useful Improvements in Pipe-Joints; and I do hereby declare the following to be a full, clear, and exact description of the invention, such as will enable others skilled in the art to which it appertains to make and use the same.

My invention relates to an improvement in joining or coupling metal and pottery pipes; and my object is to produce a joint which can be easily made, and which will be perfectly tight and prevent any escape of foul air or injurious gases.

Figure 1:
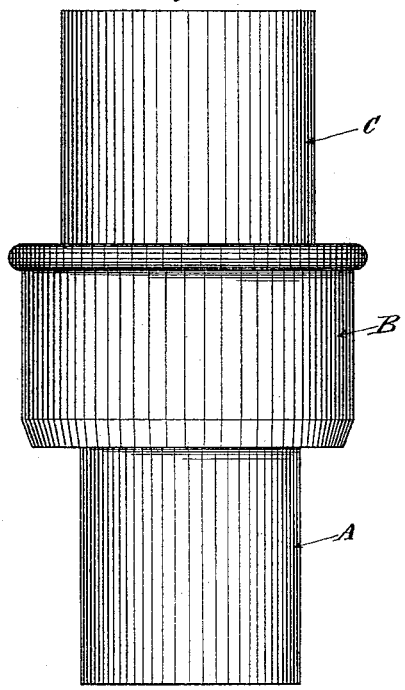
Figure 2:
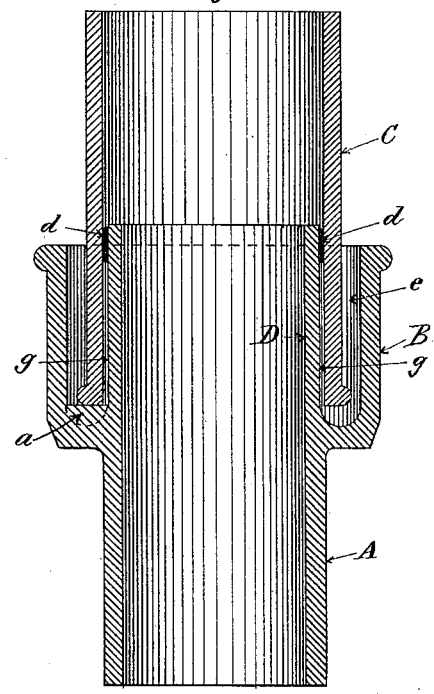
Figure 3:
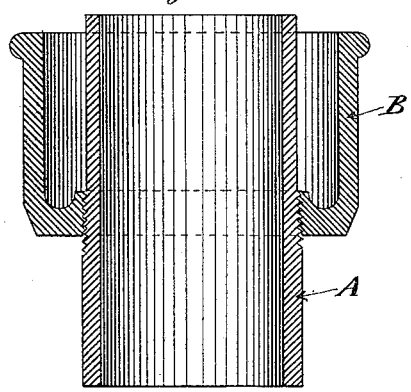
Figure 4:
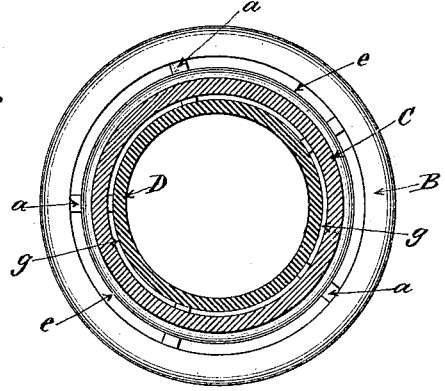

In the annexed drawings, Figure 1 represents an outside view of my improved joint. Fig. 2 is a vertical section through the joint. Fig. 3 represents a detail of the hub, being screwed on the pipe; and Fig. 4 is a top or plan view of the joint.

The method heretofore used for joining pipes was to have one end of the pipe enlarged, thus forming a hub, into which the small end of the other section of pipe could be inserted. Oakum or other calking material had then to be inserted into the space formed by the small end of the pipe and the hub, which had to be pushed down to the bottom of the hub and calked, so that the molten lead or solder which is poured into the space to perfect the joint could not escape into the pipe. If the end of the pipe which is fitted into the hub is not cut perfectly straight, the oakum would be driven into the pipe during the act of calking, and would form an obstruction in the pipe, from which it would quickly clog and fill up.

The object of my invention is to make a joint which requires no oakum or other calking material—a joint which will be stronger than the old one, and which is made perfectly and reliably tight by the molten lead only.

As is shown in Fig. 2, the pipe A has its hub not cast or attached to the end, as has been formerly the case; but it sits back from the end, so that the continuation D of the pipe A runs clear through the hub B and a little above the end or flange of the hub, thus forming a double pipe for a short distance, the space $e$ between them being closed at the lower end. In the bottom of the space $e$ are a few small ribs, $a$. The pipe C, which is to be joined to the pipe A, is large enough on its lower end to push over or telescope the continuation D, leaving a small space, $g$, between them, and when so pushed down the end of the pipe C rests on the small ribs $a$. The molten lead is then poured into the space $e$, formed by the hub B and pipe C, and as the pipe C stands only on the ribs $a$ the metal runs under the end of the pipe C and into the small space $g$, where it rises to the same height as it does in the space $e$; but it cannot run into the pipe, because the continuation D of the pipe A is higher than the hub B. In this manner a much stronger joint than the one now in use is produced, as it has one more thickness of iron or metal, and has two thicknesses of lead or similar material to insure its perfect tightness.

In horizontal joints it is necessary to prevent the molten lead from running into the pipe, and to accomplish this I propose to put a small rubber band or other packing-ring, $d$, as shown in Fig. 2, on the end of the pipe D, so that the pipe C fits tightly over it, thus keeping the molten lead out of the pipe.

It is not absolutely necessary that the hub B should be cast on the pipe. It can be made separate and screwed on, as shown in Fig. 3, or fastened by any other suitable method.

Having thus fully described my invention, what I claim as new, and desire to secure by Letters Patent, is—

1. In a pipe-joint, the pipe A, having a continuation, D, and a slightly shorter hub, B, surrounding it, thus forming a recess in which are contained the ribs $a$, in combination with the pipe C, telescoping over the continuation D of the pipe A, substantially as and for the purpose set forth.

2. In a pipe-joint, the pipe A, having a continuation, D, and a slightly shorter hub, B, with the ribs $a$, in combination with the pipe C, and a rubber or packing ring, $d$, substantially as and for the purpose described.

In testimony whereof I affix my signature in presence of two witnesses.

GEO. R. SCOTT.

Witnesses:
CHARLES HEMJE,
THOS. D. SMITH.